(12) United States Patent
Hsieh et al.

(10) Patent No.: US 9,772,537 B2
(45) Date of Patent: Sep. 26, 2017

(54) EDGE-LIT BACKLIGHT MODULE

(71) Applicant: InnoLux Corporation, Jhu-Nan, Miao-Li County (TW)

(72) Inventors: Chung-Chih Hsieh, Jhu-Nan (TW); Wen-Bin Hu, Jhu-Nan (TW); Dong Chang, Jhu-Nan (TW)

(73) Assignee: Innolux Corporation, Jhu-Nan, Miao-Li County (TW)

( * ) Notice: Subject to any disclaimer, the term of this patent is extended or adjusted under 35 U.S.C. 154(b) by 23 days.

(21) Appl. No.: 15/063,805

(22) Filed: Mar. 8, 2016

(65) Prior Publication Data

US 2016/0273742 A1   Sep. 22, 2016

(30) Foreign Application Priority Data

Mar. 20, 2015  (CN) .......................... 2015 1 0124464
Sep. 11, 2015  (CN) .......................... 2015 1 0577337

(51) Int. Cl.
| | | |
|---|---|---|
| *G02F 1/1335* | (2006.01) | |
| *G02F 1/153* | (2006.01) | |
| *F21V 19/00* | (2006.01) | |
| *F21K 9/00* | (2016.01) | |
| *F21K 9/235* | (2016.01) | |
| *F21K 9/20* | (2016.01) | |

(52) U.S. Cl.
CPC ...... *G02F 1/1533* (2013.01); *G02F 1/133615* (2013.01); *F21K 9/00* (2013.01); *F21K 9/20* (2016.08); *F21K 9/235* (2016.08); *F21V 19/003* (2013.01); *F21V 19/004* (2013.01); *F21V 19/005* (2013.01); *F21V 19/0035* (2013.01); *F21V 19/0045* (2013.01); *F21V 19/0055* (2013.01)

(58) Field of Classification Search
None
See application file for complete search history.

(56) References Cited

U.S. PATENT DOCUMENTS

| | | | | |
|---|---|---|---|---|
| 9,612,391 B2 * | 4/2017 | Wu | ....................... | G02B 6/0075 |
| 2012/0026423 A1 * | 2/2012 | He | ....................... | G02B 6/0068 |
| | | | | 349/62 |
| 2013/0321496 A1 * | 12/2013 | Weller | ................. | G02B 6/0078 |
| | | | | 345/694 |
| 2014/0036530 A1 * | 2/2014 | Yang | ..................... | G02F 1/1336 |
| | | | | 362/606 |

\* cited by examiner

*Primary Examiner* — Kristy A Haupt
(74) *Attorney, Agent, or Firm* — Muncy, Geissler, Olds & Lowe, P.C.

(57) ABSTRACT

An edge-lit backlight module according to this disclosure includes a frame body and a light-emitting unit. The frame body includes a bottom portion, a wall portion and at least one first positioning portion. The wall portion is connected with the bottom portion, and the first positioning portion is located at least one of the bottom portion and the wall portion. The light-emitting unit includes a circuit board and a plurality of light-emitting elements disposed on the circuit board. The circuit board includes at least one second positioning portion. The second positioning portion includes a notch and an extension portion extending from the circuit board. The first positioning portion and the second positioning portion engage with each other to connect the light-emitting unit with the frame body.

20 Claims, 19 Drawing Sheets

US 9,772,537 B2

EDGE-LIT BACKLIGHT MODULE

CROSS REFERENCE TO RELATED APPLICATIONS

This Non-provisional application claims priority under 35 U.S.C. §119(a) on Patent Application No(s). 201510124464.8 and 201510577337.3 filed in People's Republic of China on Mar. 20, 2015 and Sep. 11, 2015, the entire contents of which are hereby incorporated by reference.

BACKGROUND

Field of Invention

This disclosure relates to a backlight module and, in particular, to an edge-lit backlight module.

Related Art

With the progress of technologies, flat display devices have been widely applied to various kinds of fields, for example liquid crystal display (LCD) devices. Because LCD devices have advantages of compact structure, low power consumption, less weight and less radiation, they gradually take the place of cathode ray tube (CRT) display devices and are widely applied to various electronic products, such as mobile phones, portable multimedia devices, notebook computers, LCD TVs and LCD screens.

Generally, a flat display device includes a backlight module and a display panel, and the backlight module provides the light for the display panel so the display panel can display images. The backlight module includes a frame and a light-emitting unit, and the light-emitting unit is a light-emitting diode (LED) light bar for example. The light-emitting unit is disposed on a side of the frame and is fixed to the frame by engaging structures of the frame. However, during the process of installing the light-emitting unit in the frame, the installation needs to be done in an oblique direction (which means the light-emitting unit needs to be tilted for an angle) for detouring round the engaging structure. That is, the installation can't be implemented in a vertical direction, so the risk of the scrape will be tremendously increased and the process can't be practiced with the automation. Therefore, the product yield and the assembly performance will be reduced.

Therefore, an edge-lit backlight module with a structure which helps assembly in a vertical direction under automation for enhancing the product yield and the assembly performance is needed.

SUMMARY

An aspect is to provide an edge-lit backlight module with a structure which helps assembly in a vertical direction under automation for enhancing the product yield and the assembly performance.

An edge-lit backlight module according to this disclosure includes a frame body and a light-emitting unit. The frame body includes a bottom portion, a wall portion and at least one first positioning portion. The wall portion is connected with the bottom portion, and the first positioning portion is located at least one of the bottom portion and the wall portion. The light-emitting unit includes a circuit board and a plurality of light-emitting elements disposed on the circuit board. The circuit board includes at least one second positioning portion. The second positioning portion includes a notch and an extension portion extending from the circuit board. The first positioning portion and the second positioning portion engage with each other to connect the light-emitting unit with the frame body.

In one embodiment, the number of the first positioning portion is two, and the two first positioning portions are located at opposite sides of the frame body respectively. The number of the second positioning portion is two, and the two second positioning portions are located at opposite sides of the circuit board respectively.

In one embodiment, the notch is outwardly from the circuit board or toward the center of the circuit board.

In one embodiment, the frame body comprises at least one opening located at the bottom portion, and a part of the circuit board passes through the opening.

In one embodiment, the frame body comprises at least one pressing portion located at the wall portion and adjacent to the opening, the pressing portion acts as a first guiding element, a part of the bottom portion facing the opening forms a curved second guiding element, and the first guiding element and the second guiding element constitute a guiding portion.

In one embodiment, the opening comprises a first opening and a second opening, the first opening is adjacent to the second opening, and a width of the first opening is greater than that of the second opening. A part of the circuit board passes through the first opening and then moves towards the second opening, and the first positioning portion and the second positioning portion engage with each other.

In one embodiment, the light-emitting unit further comprises an adhesive element disposed between the circuit board and the frame body to fix the circuit board to the frame body.

In one embodiment, the second positioning portion is a U-like structure or an L-like structure.

In one embodiment, the extension portion passes through the bottom portion and the notch of the second positioning portion holds the first positioning portion.

In one embodiment, the opening comprises a first opening and a second opening adjacent to the first opening, an extension direction of the first opening in width and an extension direction of the second opening in width are both perpendicular to a straight direction from the first opening to the second opening, and the width of the first opening is greater than the width of the second opening.

In one embodiment, the frame body further comprises a guiding portion, and a part of the guiding portion extends from an edge of the first opening to an edge of the second opening.

In one embodiment, a height of the notch is substantially greater than a thickness of the bottom portion of the frame body.

In one embodiment, the frame body further comprises a guiding portion, and at least a part of the guiding portion and the first positioning portion are staggered.

In one embodiment, the frame body further comprises a first guiding element and a second guiding element, the first guiding element is connected with the first positioning portion, and the second guiding element extends from the wall portion and is opposite to the first guiding element.

In one embodiment, the frame body further comprises a guiding portion, and at least a part of the guiding portion is connected with the first positioning portion.

In one embodiment, the light-emitting unit further comprises a connector disposed on the circuit board, and the frame body further comprises a connector stopping portion located corresponding to the connector.

In one embodiment, the connector stopping portion includes at least one stopping element and at least one bent element, the stopping element is opposite to the wall portion, and the bent element extends from the stopping element to the wall portion.

In one embodiment, the number of the bent elements is two, and the bent elements are respectively located at two ends of the stopping element.

In one embodiment, the bent element comprises at least one slant surface, and the slant surface inclines from a top surface of the bent element to the bottom portion.

In one embodiment, the frame body further includes a U-like portion and an additional wall portion connected to the bottom portion, the U-like portion is located between the wall portion and the additional wall portion, and the bent element is connected to the additional wall portion through the U-like portion.

In one embodiment, the connector stopping portion at its one end away from the bottom portion includes a curved guiding portion.

In one embodiment, the connector stopping portion includes a concave portion, and the concave portion concaves toward a direction away from the wall portion.

As mentioned above, according to some embodiments, in the edge-lit backlight module, the frame body includes at least one first positioning portion, the circuit board of the light-emitting unit includes at least one corresponding second positioning portion and the second positioning portion includes a notch and an extension portion extending from the circuit board, so the light-emitting unit and the frame body can be connected with each other by engaging the first positioning portion with the second positioning portion. Accordingly, in comparison with the conventional art, the circuit board of the edge-lit backlight module is configured with the second positioning portion, and the first positioning portion is designed corresponding to the second positioning portion, so the light-emitting unit can be installed and fixed to the frame body by the movement in two or three straight directions. Thereby, the assembly process can be implemented by the automation to replace the manual operation by the mechanical equipment, so the product yield and the assembly performance can be enhanced. Moreover, the assembly procedure can be appropriately switched to manual mode or automated mode depending on different requirements of production lines.

Besides, according to some embodiments, the assembly performance of the light-emitting unit and the product yield of the edge-lit backlight module are also enhanced due to the connector stopping portion.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION

Figure 1A:
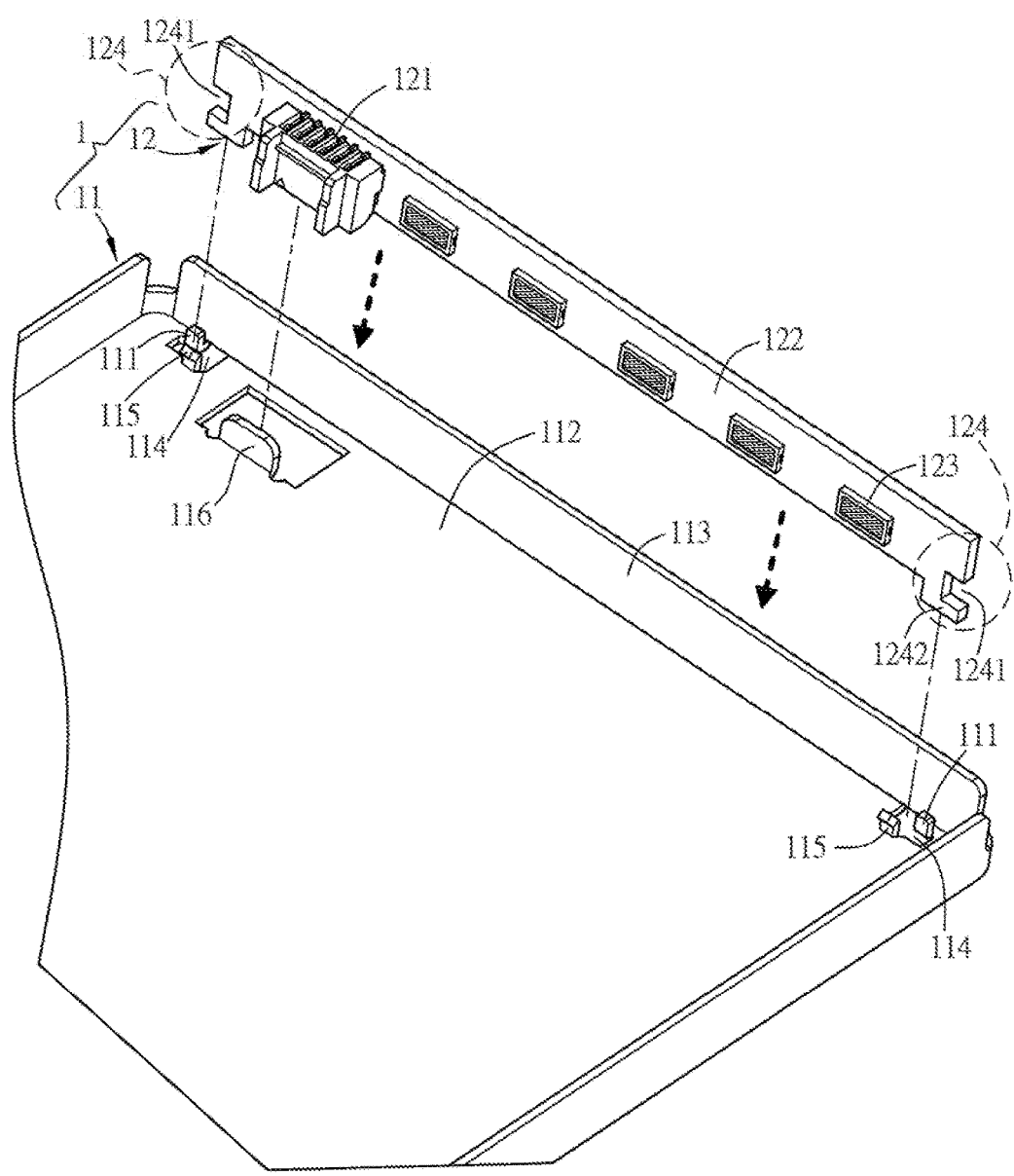
FIGS. 1A to 1D are schematic diagrams of the edge-lit backlight module and the assembly process thereof according to the first embodiment.

The present disclosure will be apparent from the following detailed description, which proceeds with reference to the accompanying drawings, wherein the same references relate to the same elements.

The applied field of the edge-lit backlight module of this disclosure is not limited. For example, it may be related to a display device or a light-emitting device. For example, the display device is a television, a monitor, a tablet computer or a screen wall. For example, the light-emitting device is a light source.

FIGS. 1A to 1E are schematic diagrams of the edge-lit backlight module 1 and the assembly process thereof according to the first embodiment. As shown in FIGS. 1A to 1E, the edge-lit backlight module 1 includes a frame body 11 and a light-emitting unit 12. According to various applications of the edge-lit backlight module 1, the edge-lit backlight module 1 can further include other additional components such as a light-guiding plate or a plurality optical films.

The frame body 11 includes at least one first positioning portion 111, and here are two first positioning portions 111 for example. Herein, the frame body 11 includes a bottom portion 112 and a wall portion 113, and the wall portion 113 is located at a side of the bottom portion 112 and is connected with the bottom portion 112. In this embodiment, each of the first positioning portions 111 is a positioning protrusion extending from the bottom portion 112. That is, the first positioning portion 111 is located at the bottom portion 112 and near the wall portion 113. For example, the bottom portion 112 includes an opening 114, and the first positioning portion 111 is located at a side of the opening 114 and protrudes from the bottom portion 112. Herein, the two first positioning portions 111 are respectively located at the opposite sides of the frame body 11 and are respectively located at the opposite sides of the bottom portion 112. Besides, the frame body 11 can further include a guiding portion 115, which is a positioning protrusion extending from the bottom portion 112 and adjacent to the first positioning portion 111 for guiding the entrance of the light-emitting unit 12 to facilitate the assembly. Herein, the guiding portion 115 and the first positioning portion 111 are staggered. For example, the guiding portion 115 has an arc angle to protect the light-emitting unit 12 from being damaged during the assembly process. For example, the assembly process becomes easier due to such guiding design when switched to the manual operation. Furthermore, the frame body 11 can further include a connector stopping portion 116, which is located corresponding to a connector 121 of the light-emitting unit 12 to prevent the connector 121 from scraping other components such as the light-guiding plate and the optical films. Moreover, the first positioning portion 111 of this embodiment can be located at least one of the bottom portion 112 and the wall portion 113.

The light-emitting unit 12 includes a circuit board 122 and a plurality of light-emitting elements 123. The light-emitting elements 123 are disposed on the circuit board 122 and can be light-emitting diode (LED) elements for example. The circuit board 122 includes at least one second positioning portion 124, and here are two second positioning portions 124 for example. For instance, each of the second positioning portions 124 of this embodiment includes an extension portion 1242 extending from the circuit board and being a U-like structure. Each of the second positioning portions 124 includes a notch 1241 outwardly from the circuit board 122. A height of the notch 1241 is slightly greater than the thickness of the bottom portion 112 of the frame body 11. The first positioning portion 111 and the second positioning portion 124 engage with each other to connect the light-emitting unit 12 with the frame body 11. Herein, the two second positioning portions 124 are located at the opposite sides of the circuit board 122 respectively. After the assembly of the light-emitting unit 12 and the frame body 11 is completed, the extension portion 1242 passes through the bottom portion 112 and a small part of the bottom portion 112 (such as the first positioning portion 111) is held in the second positioning portion 124. Herein, the notches 1241 of the two second positioning portions 124 are toward different directions, for example, they are toward the opposite directions away from the light-emitting unit 12. Moreover, the light-emitting unit 12 can further include a connector 121, which is disposed on the circuit board 122 and can provide the electricity for the light-emitting elements 123 when connected with a circuit. Besides, the light-emitting unit 12 can further include an adhesive element 126 (such as a double-sided adhesive tape or an adhesive layer), which can connect the light-emitting unit 12 and the wall portion 113 of the frame body 11. After the assembly is completed, the adhesive element 126 is disposed between the circuit board 122 and the wall portion 113 for attaching and fixing the circuit board 122 to the wall portion 113.

The following is the process of the assembly of the light-emitting unit 12 and the frame body 11.

Figure 1B:
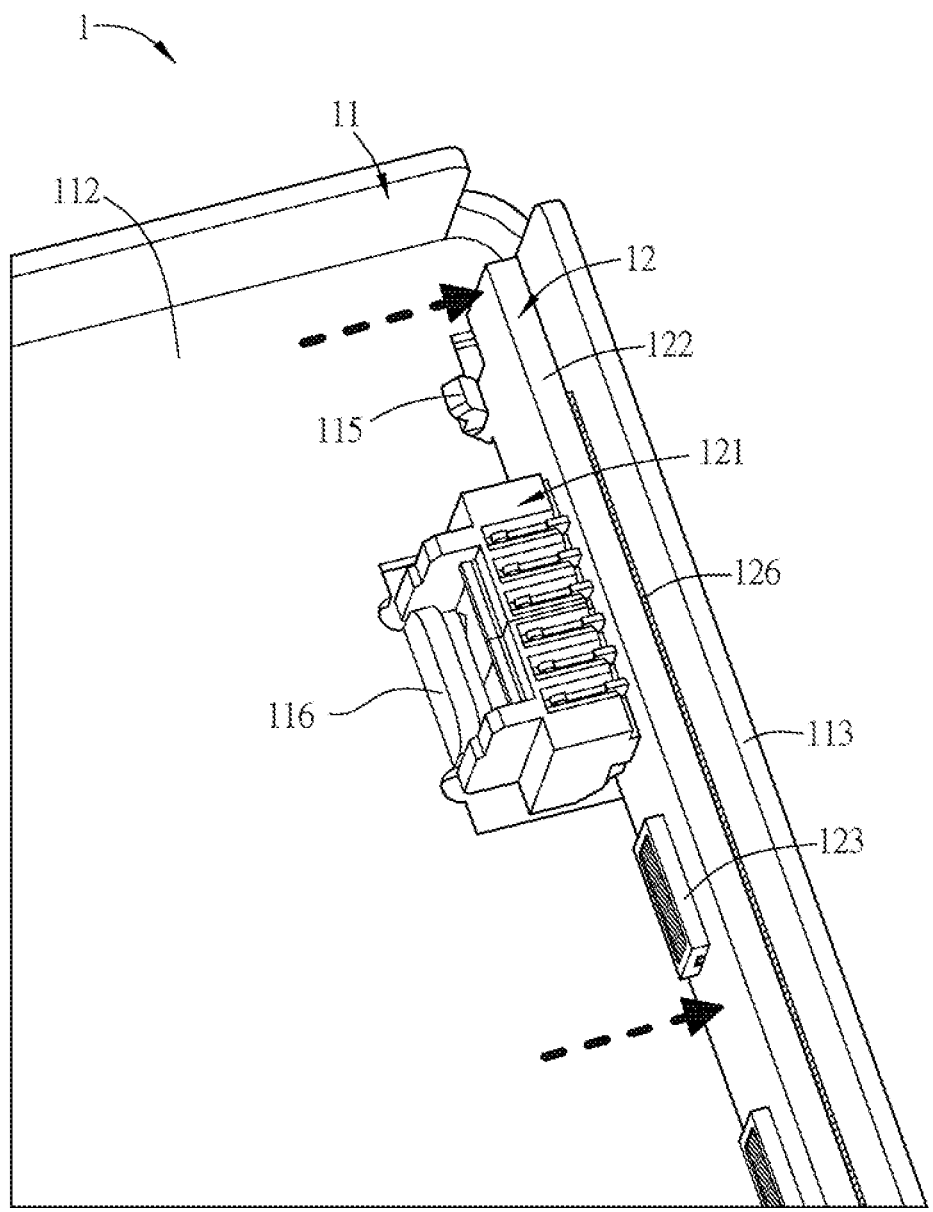
Figure 1C:
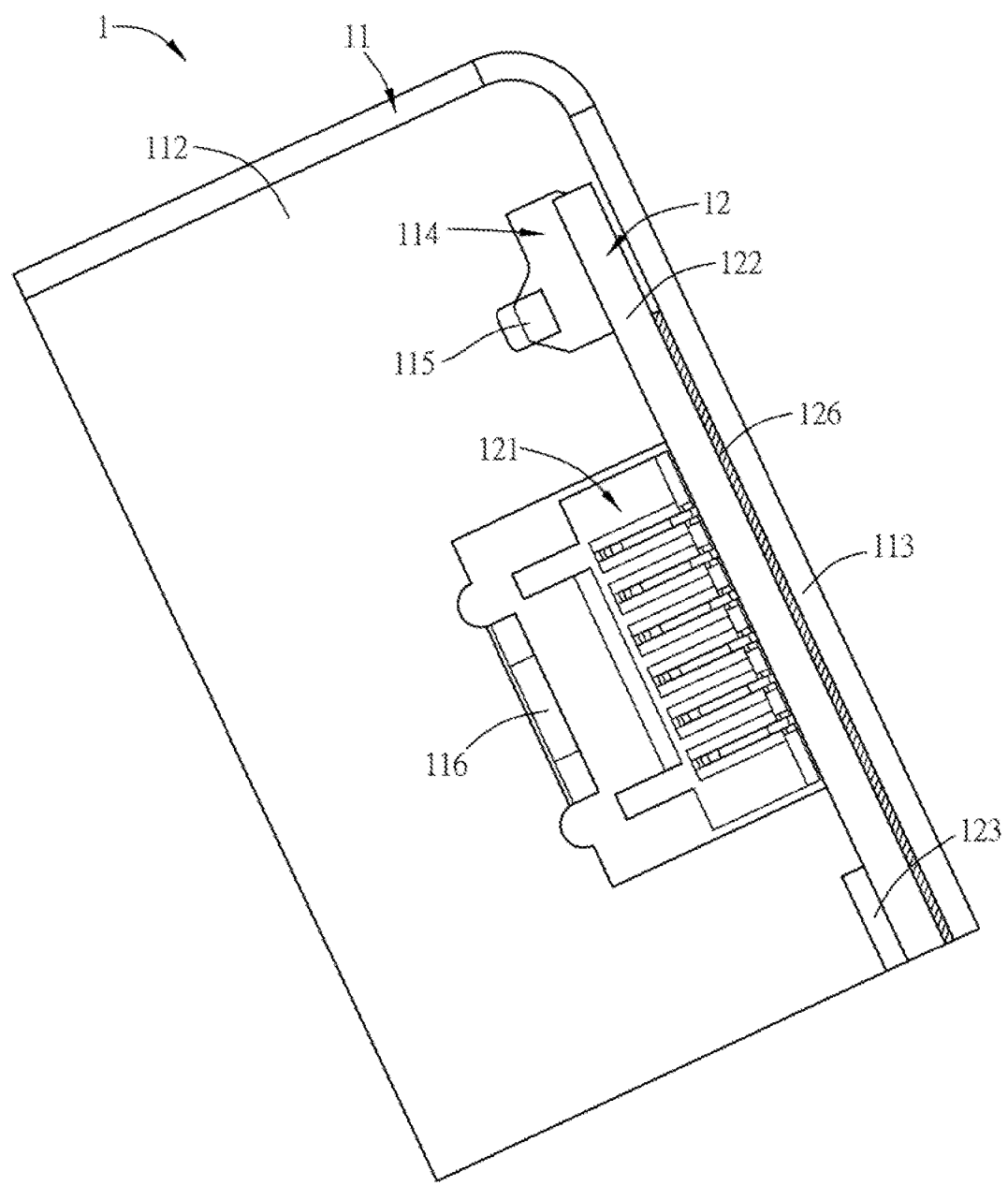
Figure 1D:
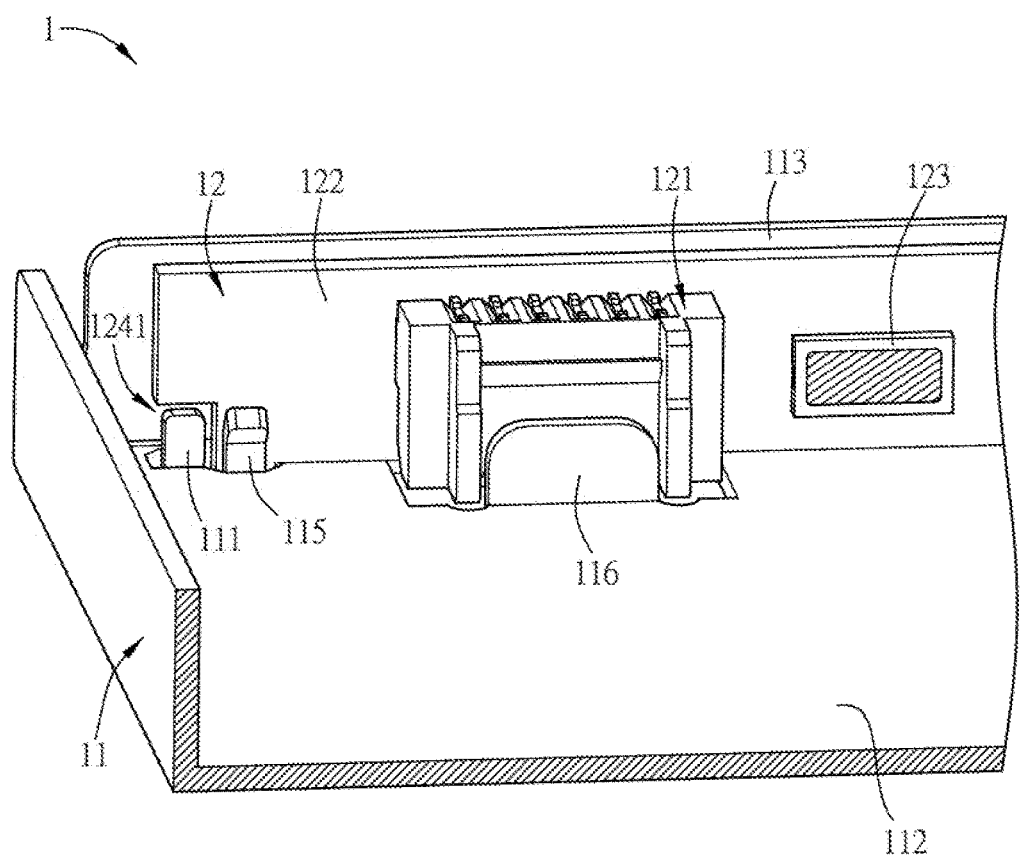

As shown in FIG. 1A, the first step is to downward insert the circuit board 122 of the light-emitting unit 12 in a vertical direction (the direction vertical to the bottom portion 112 for example) into the frame body 11, so the second positioning portion 124 of the light-emitting unit 12 enters the opening 114 of the frame body 11, or in other words, the notch 1241 of the circuit board 122 is located corresponding to the first positioning portion 111. During the process of downward inserting the light-emitting unit 12 into the frame body 11, the light-emitting unit 12 can be guided by the guiding portion 115 of the frame body 11, so as to enhance the product yield and the assembly performance and also avoid damaging the light-emitting unit 12. Then, as shown in FIG. 1B, after the light-emitting unit 12 enters the opening 114, the second step is to, move the circuit board 122 to a side of the frame body 11, i.e. the wall portion 113, or toward the first positioning portion 111, so the notch 1241 holds the first positioning portion 111, and the adhesive element 126 at the back of the circuit board 122 is attached to the wall portion 113 of the frame body 11, as shown in FIG. 1C. For example, as shown in FIG. 1D, the first positioning portion 111 and the second positioning portion 124 engage with each other. By such engagement, the notch 1241 of the second positioning portion 124 holds the first positioning portion 111 (the positioning protrusion). Accordingly, the light-emitting unit 12 and the frame body 11 can be connected with each other by the engagement between the first positioning portion 111 and the second positioning portion 124. In the assembly process, the light-emitting unit 12 simply needs to move along two directions, one of which is towards the bottom portion 112 (as the dotted arrow direction in FIG. 1A) and the other one is towards the wall portion 113 (as the dotted arrow direction in FIG. 1B). Because the light-emitting unit 12 simply needs to move along two straight directions, the assembly of the light-emitting unit 12 and the frame body 11 can be implemented by the automation equipment. Therefore, the assembly process can be executed with automation. Accordingly, the product yield and the assembly performance are enhanced. Besides, the edge-lit backlight module 1 of this embodiment may be manually assembled, either. For example, the assembly procedure can be appropriately switched to manual mode or the automated mode depending on different requirements of production lines. Moreover, this embodiment is not limited to two first positioning portions 111, only one first positioning portion or more than two first positioning portions may also function similarly. For example, one second positioning portion is located at the central lower side of the circuit board, and one first positioning portion and one opening are correspondingly located at the bottom portion of the frame body.

Figure 1E:
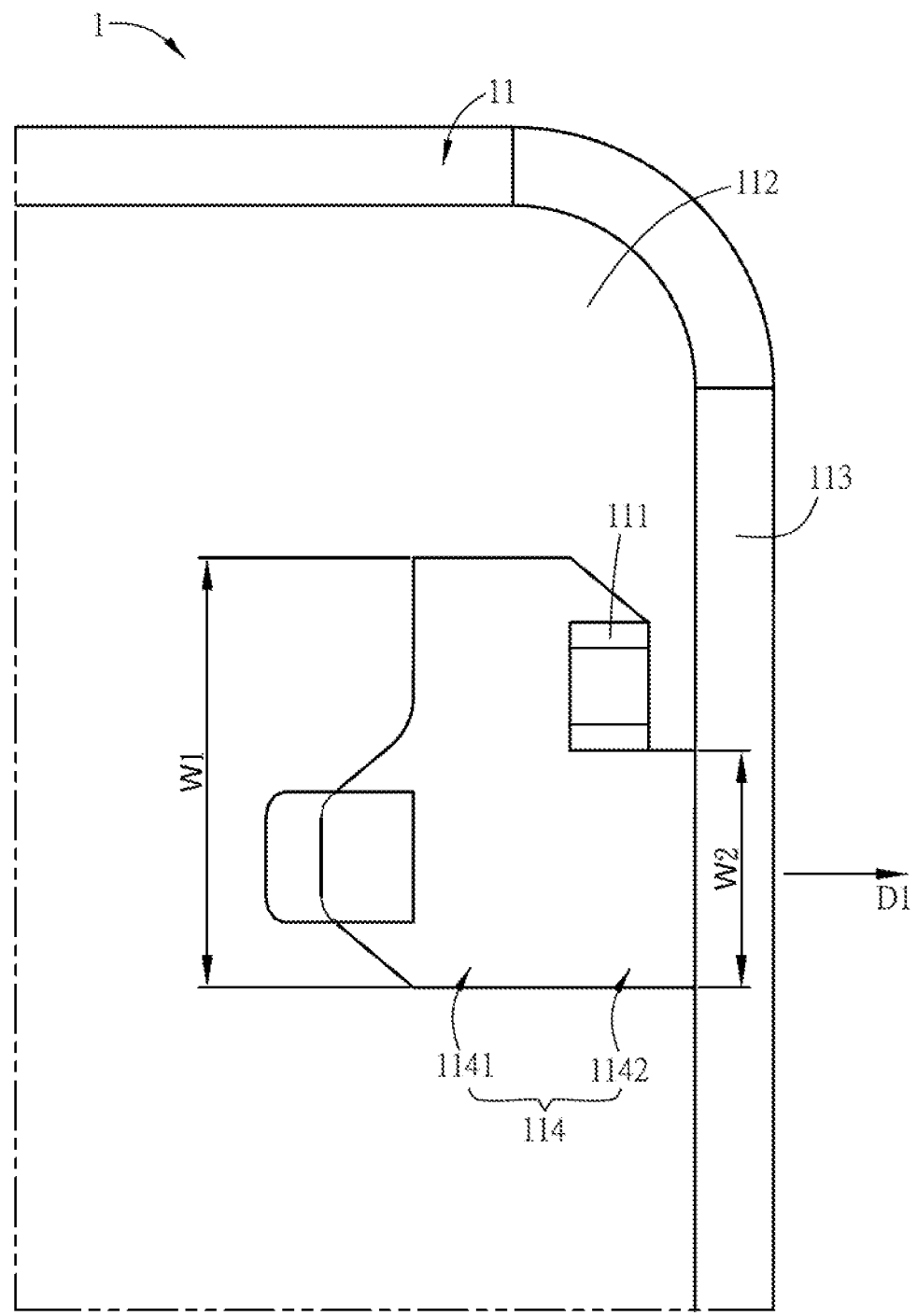
FIG. 1E is a schematic diagram of an opening of the frame body of the edge-lit backlight module of the first embodiment.

FIG. 1E is a schematic diagram of the opening 114 of the frame body 11 of the edge-lit backlight module 1 of this embodiment. As shown in FIG. 1E, the opening 114 includes a first opening 1141 and a second opening 1142. The first opening 1141 is adjacent to the second opening 1142, and the width W1 of the first opening 1141 is greater than the width W2 of the second opening 1142. Herein, the extension direction of the first opening 1141 in the width W1 as well as the extension direction of the second opening 1142 in the width W2 are perpendicular to a straight direction D1 from the first opening 1141 to the second opening 1142, and the width W1 of the first opening 1141 is greater than the width W2 of the second opening 1142. The straight direction D1 is also the direction in which the light-emitting unit 12 moves to the wall portion 113 during the assembly process (as the dotted arrow direction in FIG. 1B). A part of the circuit board 122 passes through the first opening 1141 and then moves towards the second opening 1142, so the first positioning portion 111 and the second positioning portion 124 will engage with each other.

In another aspect, the assembly method of the edge-lit backlight module 1 can further include the steps of: inserting the second positioning portion 124 of the circuit board 122 (including the extension portion 1242) into the opening 114 of the frame body 11, so the second positioning portion 124 is disposed in the first opening 1141 (the extension portion 1242 passes through the first opening 1141); and moving the circuit board 122 toward the second opening 1142, so the first positioning portion 111 and the second positioning portion 124 engage with each other, and that is, the notch 1241 of the second positioning portion 124 holds the first positioning portion 111 (the positioning protrusion). Furthermore, when the circuit board 122 moves to the direction of the second opening 1142, the adhesive element 126 will fix the circuit board 122 to the frame body 11.

FIGS. 2A to 2F are schematic diagrams of the edge-lit backlight module 2 and the assembly process thereof according to the second embodiment. As shown in FIGS. 2A to 2F, the edge-lit backlight module 2 includes a frame body 21 and a light-emitting unit 22. According to various applications, the edge-lit backlight module 2 can further include other components such as a light-guiding plate or a plurality optical films.

The frame body 21 includes at least one first positioning portion 211, and here are two first positioning portions 211 for example. Herein, the frame body 21 includes a bottom portion 212 and a wall portion 213, and the wall portion 213 is located at a side of the bottom portion 212 and connected with the bottom portion 212. In this embodiment, the two first positioning portions 211 are located at the bottom portion 212 and belong to a part of the bottom portion 212. Besides, the bottom portion 212 includes two openings 214, and the first positioning portion 211 is located at a side of a corresponding opening 214. Towards the first positioning portion 211, the opening 214 gradually narrowed from a larger opening (the first opening 2141) to a smaller opening (the second opening 2142). Herein, the two first positioning portions 211 are located at the opposite sides of the frame body 21 and at the opposite sides of the bottom portion 212, respectively. Moreover, the frame body 21 can further include at least one guiding portion 215 located on a side of the frame body 21. The guiding portion 215 is composed of a pair of the corresponding guiding elements. The first guiding element 2151 is a protrusion located at the wall portion 213 and adjacent to or in the opening 214, and the curved second guiding element 2152 is a part of the bottom portion 212 and faces the opening 214. The second guiding element 2152 and the first guiding element 2151 are opposite to each other. The guiding portion 215 is adjacent to the first positioning portion 211 for guiding the light-emitting unit 22 to enter the second opening 2142 so as to facilitate the assembly. A part of the guiding portion 215 (i.e. the second guiding element 2152 herein) has an arc angle to avoid damaging the light-emitting unit 22. For example, the assembly process becomes easier due to such guiding design when switched to the manual operation. Besides, the frame body 21 can further include at least one pressing portion 217, which is used to press a circuit board 222 of the light-emitting unit 22 or limit the position of the circuit board 222. Herein, the first guiding element 2151 of the frame body 21 is used as the pressing portion 217. Herein, the positions of the pressing portion 217 and the first positioning portion 211 are adjacent to the opening 214. Moreover, as shown in FIG. 2F, the opening 214 of this embodiment includes a first opening 2141 and a second opening 2142. The first opening 2141 is adjacent to the second opening 2142, and the width W1 of the first opening 2141 is greater than the width W2 of the second opening 2142. Herein, the extension direction of the first opening 2141 in the width W1 and the extension direction of the second opening 2142 in the width W2 are both perpendicular to a straight direction D2 from the first opening 2141 to the second opening 2142. A part of the guiding portion 215 extends from an edge of the first opening 2141 to an edge of the second opening 2142, and at least a part of the guiding portion 215 is connected with the first positioning portion 211. The first opening 2141 can help the circuit board 222 to pass through the bottom portion 212 more smoothly, and the second opening 2142 can position the circuit board 222. In other embodiments, the pressing portion 217 and the guiding portion 215 may be different components. Besides, the frame body 21 can further include a connector stopping portion 216, which is located corresponding to a connector 221 of the light-emitting unit 22 to prevent the connector 221 from scraping other components such as the light-guiding plate and the optical films. Moreover, this embodiment is not limited to two first positioning portions 211, and only one first positioning portion or more than two first positioning portions may also function similarly.

The light-emitting unit 22 includes a circuit board 222 and a plurality of light-emitting elements 223. The light-emitting elements 223 are disposed on the circuit board 222 and can be light-emitting diode (LED) elements for example. The circuit board 222 includes at least one second positioning portion 224, and here are two second positioning portions 224 for example. The light-emitting unit 22 and the frame body 21 are connected with each other by the engagement between the first positioning portion 211 and the second positioning portion 224. Herein, the two second positioning portions 224 are located at the opposite sides of the circuit board 222 respectively, and the notch 2241 of the left second positioning portion 224 is toward the center of the circuit board 222 and the notch 2241 of the right second positioning portion 224 is outwardly from the circuit board 222. For instance, the second positioning portion 224 of this embodiment includes an extension portion 2242 extending from the circuit board and being a U-like structure. A height of the notch 2241 of the second positioning portion 224 is slightly greater than a thickness of the bottom portion 212 of the frame body 21. Thereby, when the light-emitting unit 22 and the bottom portion 212 are fixed to each other, the notch 2241 of the second positioning portion 224 can hold a part of the bottom portion 212 (i.e. the first positioning portion 211 herein). In this embodiment, after the assembly of the light-emitting unit 22 and the frame body 21 is completed, the extension portion 2242 of the second positioning portion 224 passes through the bottom portion 212 and a small part of the bottom portion 212 is held by the second positioning portion 224. Moreover, the light-emitting unit 22 can further include a connector 221, which is disposed on the circuit board 222 and can provide the electricity for the light-emitting elements 223 when connected with a circuit. Besides, the light-emitting unit 22 can further include an adhesive element 226 (such as a double-sided adhesive tape or an adhesive layer), which can connect the light-emitting unit 22 and the frame body 21. After the assembly is completed, the adhesive element 226 is disposed between the circuit board 222 and the frame body 21 to connect the circuit board 222 and the frame body 21 for fixing the circuit board 222 on the wall portion 213 of the frame body 21 by the adhesion.

The following is the process of the assembly of the light-emitting unit 22 and the frame body 21.

Figure 2A:
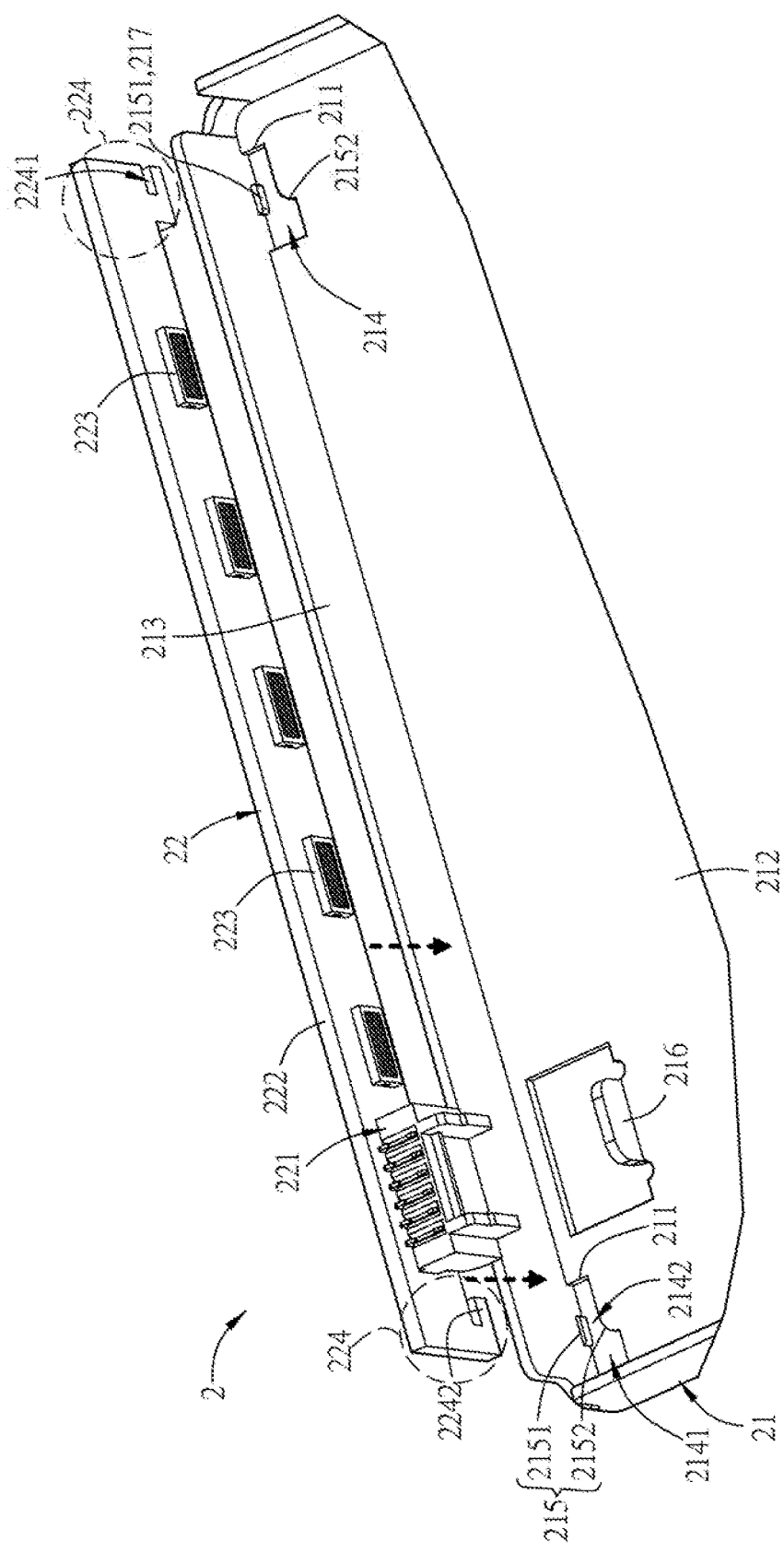
FIGS. 2A to 2E are schematic diagrams of the edge-lit backlight module and the assembly process thereof according to the second embodiment.
Figure 2B:
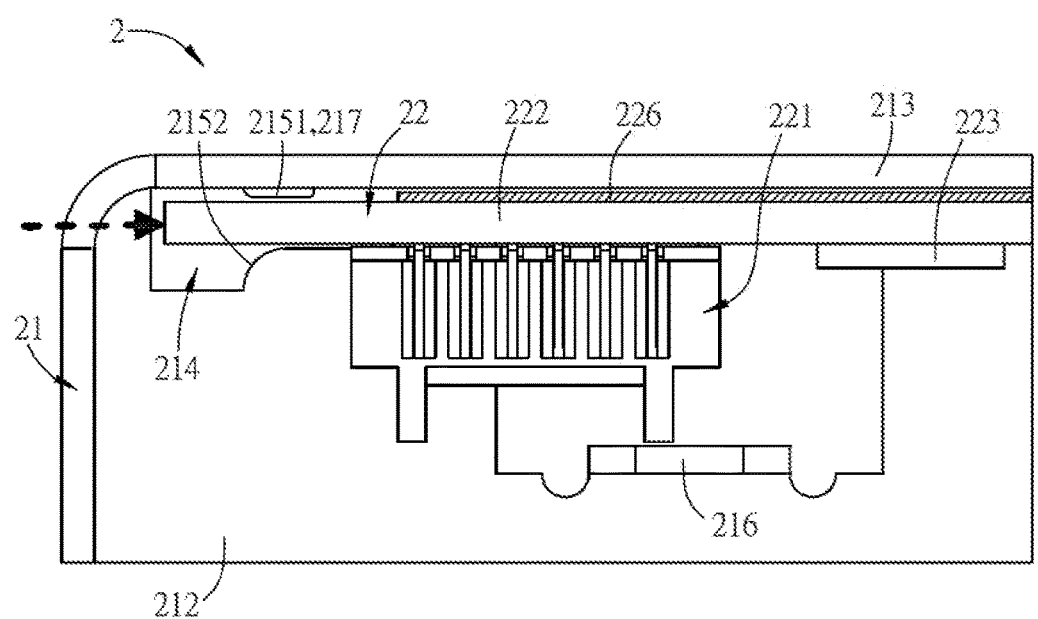
Figure 2C:
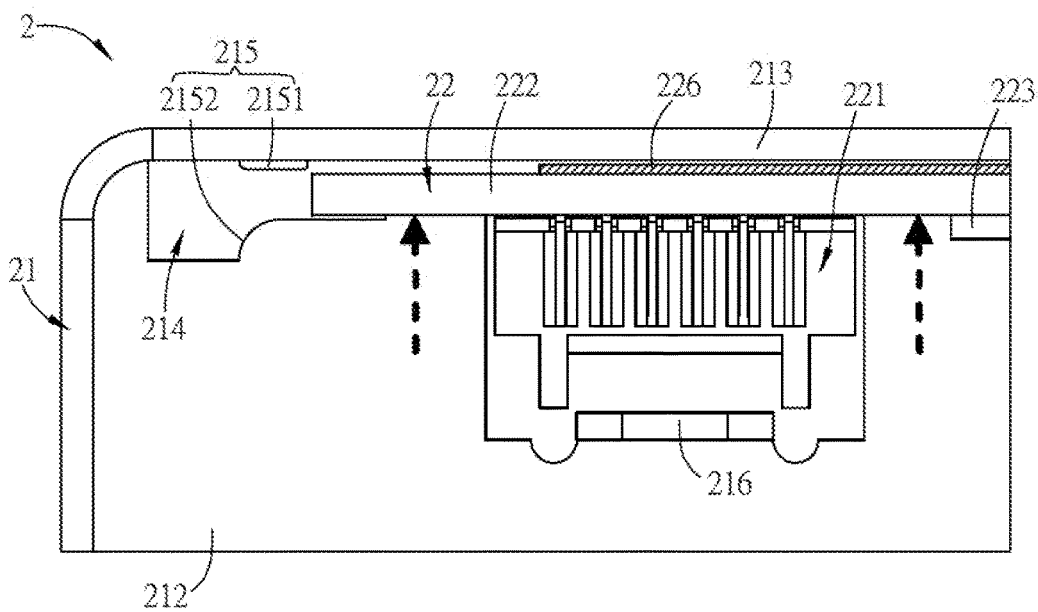
Figure 2D:
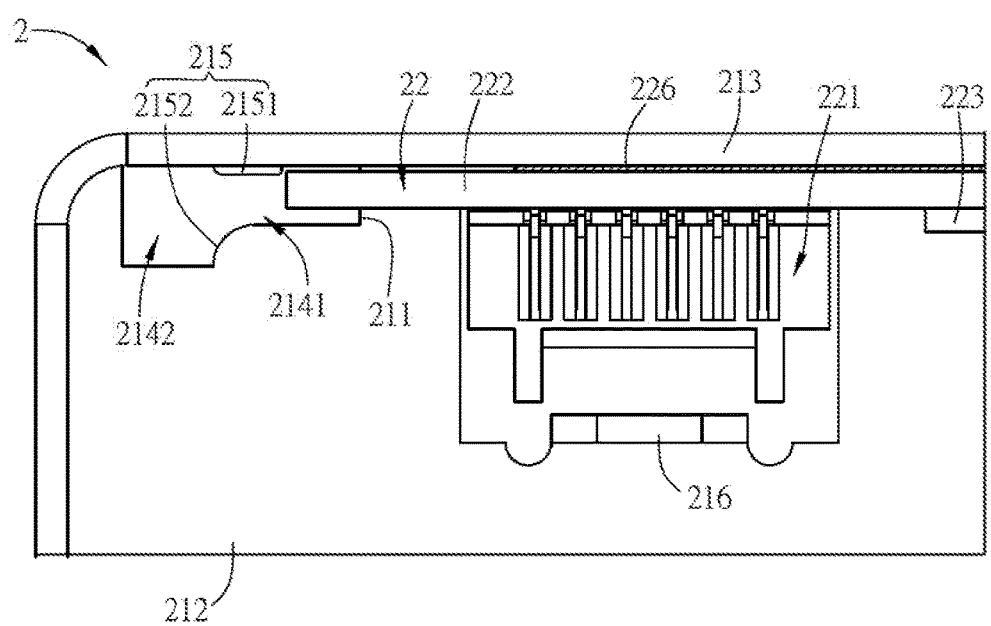
Figure 2E:
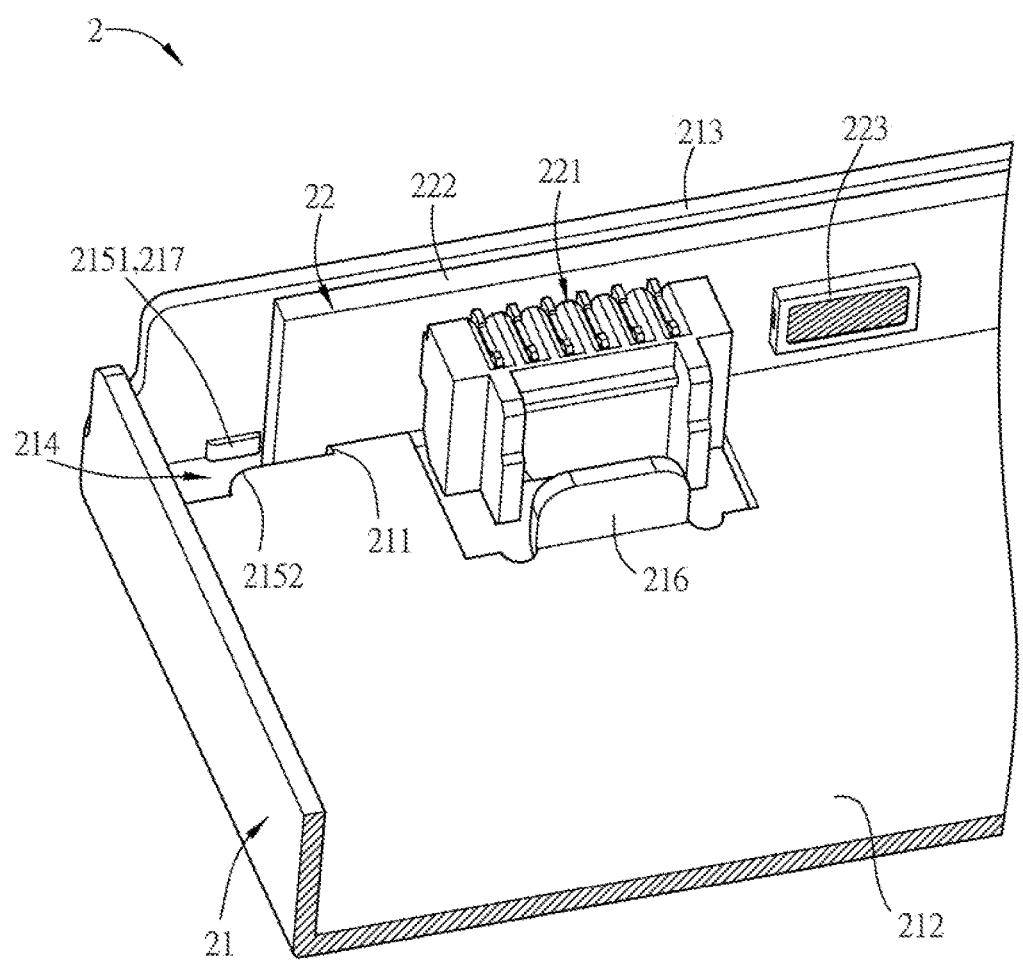
Figure 2F:
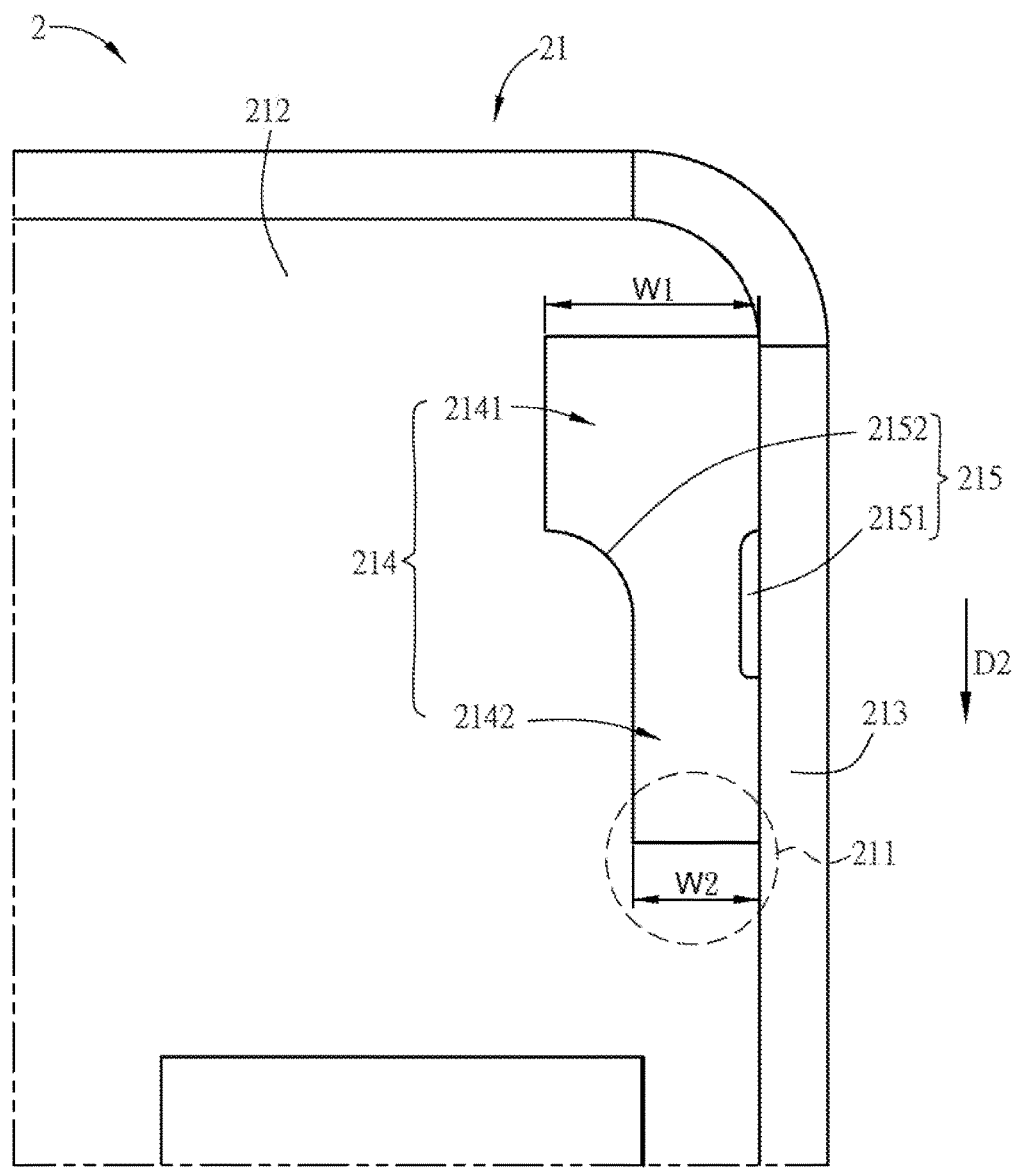
FIG. 2F is a schematic diagram of an opening of the frame body of the edge-lit backlight module of the second embodiment.

As shown in FIG. 2A, the first step is to downward insert the circuit board 222 of the light-emitting unit 22 in a direction vertical to the bottom portion 212 into the frame body 21, so a part of the second positioning portion 224 of the light-emitting unit 22 (i.e. the extension portion 2242 herein) enters the opening 214 of the frame body 21 (the first opening 2141) or the notch 2241 of the circuit board 222 is located corresponding to the first positioning portion 211. Then, as shown in FIG. 2B, the second step is to move the circuit board 222 to the first positioning portion 211 of the frame body 21 or to the second opening 2142 (i.e. to the right side of the figure) to make the notch 2241 of the second positioning portion 224 of the light-emitting unit 22 hold a part of the bottom portion 212 (the first positioning portion 211). During the process of moving the light-emitting unit 22 rightward to the frame body 21, the light-emitting unit 22 can be guided by the guiding portion 215 of the frame body 21, so as to enhance the product yield and the assembly performance and also avoid damaging the light-emitting unit 22. Then, as shown in FIG. 2C, the third step is to, after the second positioning portion 224 of the light-emitting unit 22 is engaged with the first positioning portion 211 of the frame body 21, move the circuit board 222 to a side of the frame body 21, i.e. the wall portion 213, so the adhesive element 226 at the back of the circuit board 222 is attached and fixed to the wall portion 213 of the frame body 21, as shown in FIG. 2D. At this time, as shown in FIG. 2E, the first positioning portion 211 and the second positioning portion 224 engage with each other. Because towards the first positioning portion 211, the opening 214 is gradually narrowed from a bigger opening to a smaller opening and the pressing portion 217 can limit the position of the second positioning portion 224, the light-emitting unit 22 and the frame body 21 can be connected with each other by the engagement between the first positioning portion 211 and the second positioning portion 224. In the assembly process, the light-emitting unit 22 simply needs to move along three directions, one of which is towards the bottom portion 212 (as the dotted arrow direction in FIG. 2A), another one of which is towards the first positioning portion 211 (as the dotted arrow direction in FIG. 2B) i.e. the direction from the first opening 2141 to the second opening 2142, and the other one is towards the wall portion 213 (as the dotted arrow direction in FIG. 2C). Because the light-emitting unit 22 simply needs to move along three straight directions, the assembly process of the light-emitting unit 22 and the frame body 21 can be implemented by the automation equipment. Therefore, the assembly process can be executed with automation. Accordingly, the product yield and the assembly performance are enhanced. Thus, the edge-lit backlight module 2 of this embodiment can be assembled by automation or manual operation. Besides, the structure of this embodiment is simpler than that of the first embodiment and the positioning operation can be given more tolerance.

In another aspect, the assembly method of the edge-lit backlight module 2 can further include the steps of: inserting the second positioning portion 224 of the circuit board 222 (including the extension portion 2242) into the opening 214 of the frame body 21, so the second positioning portion 224 is disposed in the first opening 2141 (the extension portion 2242 passes through the first opening 2141); and moving the circuit board 222 to the direction of the second opening 2142, so the first positioning portion 211 and the second positioning portion 224 engage with each other, and that is, the notch 2241 of the second positioning portion 224 holds a part of the bottom portion 212 (the first positioning portion 211). Furthermore, the assembly method can further include the step of: moving the circuit board 222 toward the wall portion 213, so the adhesive element 226 fixes the circuit board 222 to the frame body 21.

Figure 3A:
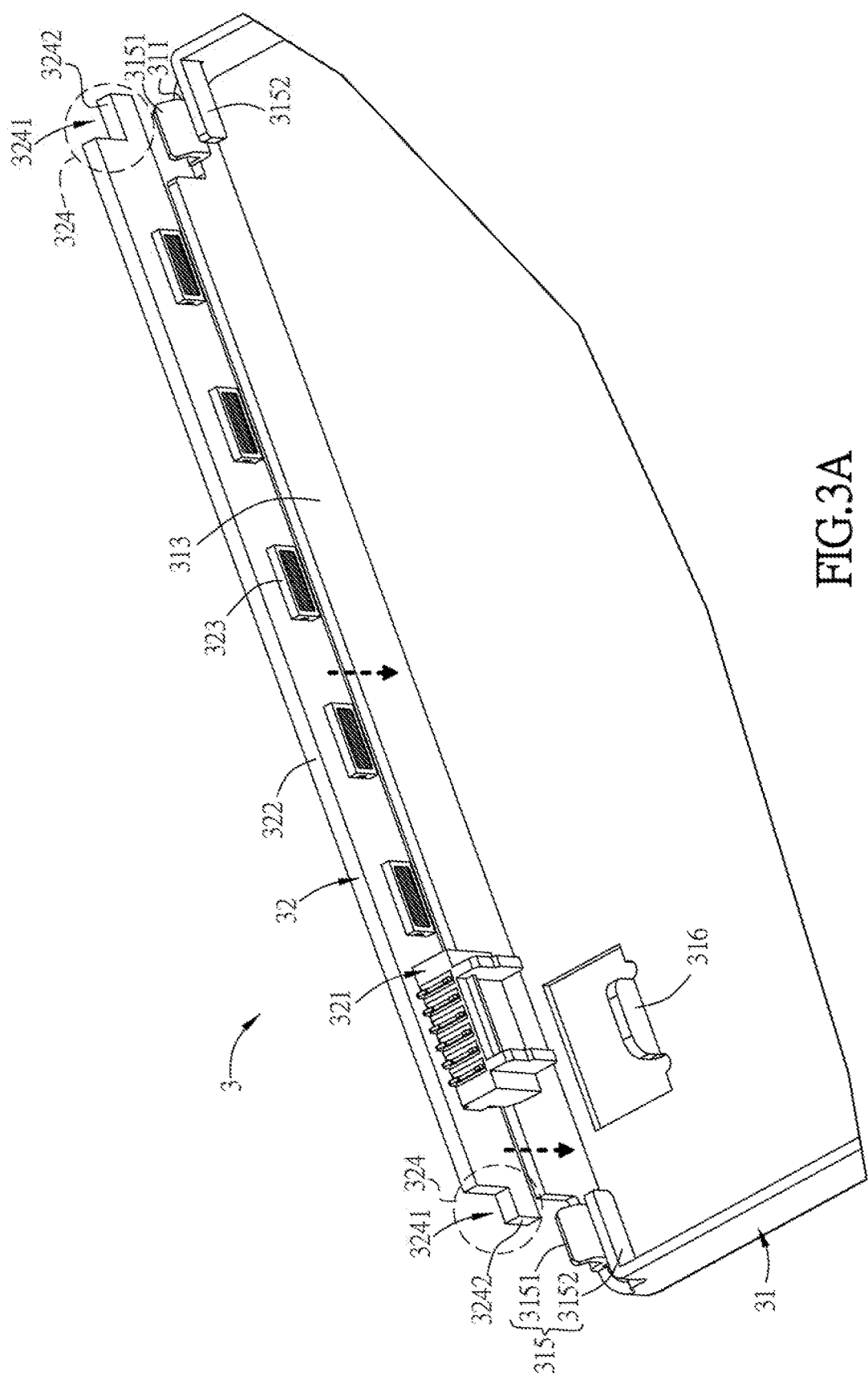
FIGS. 3A to 3C are schematic diagrams of the edge-lit backlight module and the assembly process thereof according to the third embodiment.
Figure 3B:
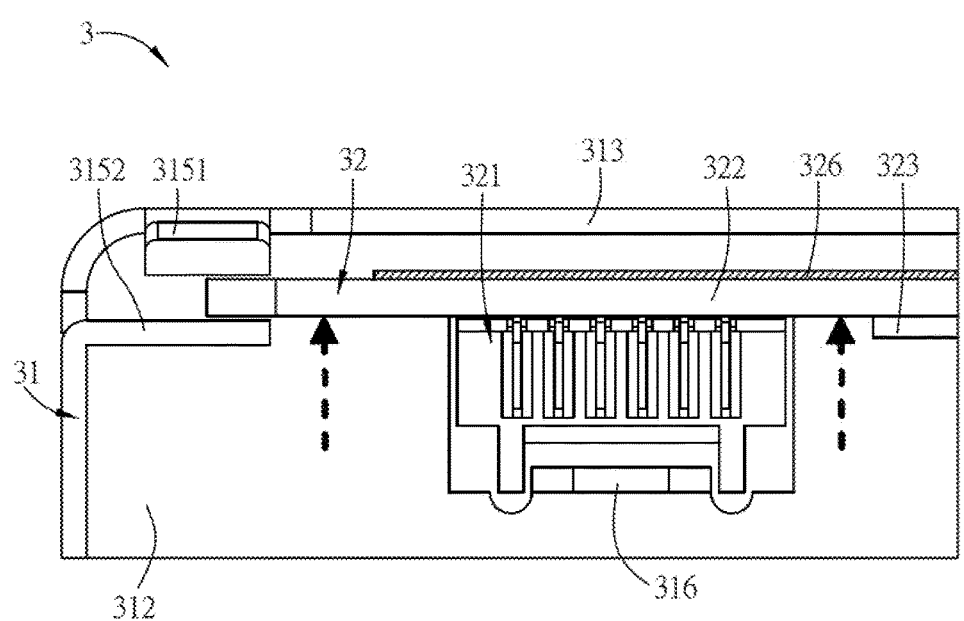
Figure 3C:
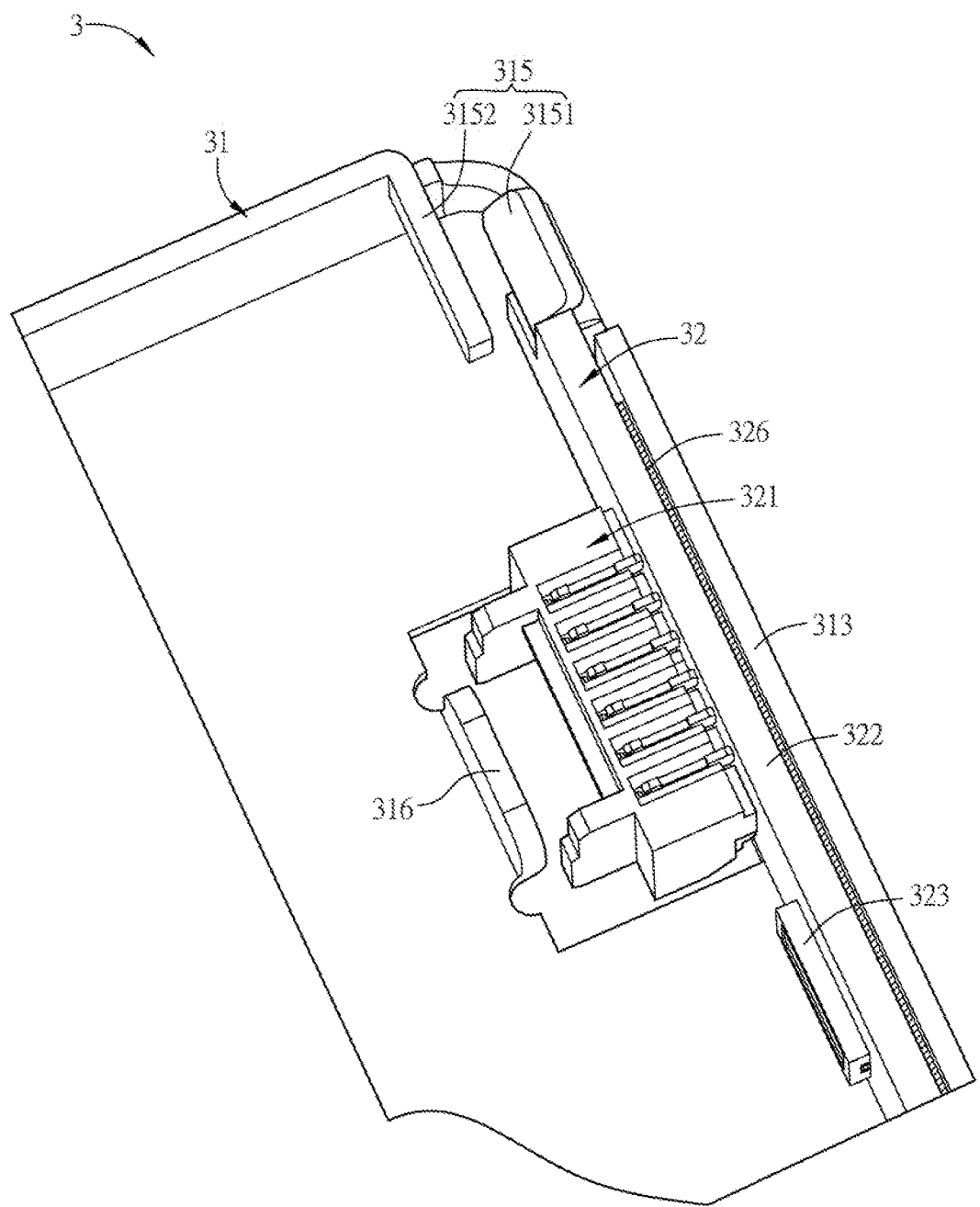

FIGS. 3A to 3C are schematic diagrams of the edge-lit backlight module 3 and the assembly process thereof according to the third embodiment. As shown in FIGS. 3A to 3C, the edge-lit backlight module 3 includes a frame body 31 and a light-emitting unit 32. According to various applications, the edge-lit backlight module 3 can further include other components such as a light-guiding plate or a plurality optical films.

The frame body 31 includes at least one first positioning portion 311, and here are two first positioning portions for example. Herein, the frame body 31 includes a bottom portion 312 and a wall portion 313, and the wall portion 313 is located at a side of the bottom portion 312 and connected with the bottom portion 312. In this embodiment, the first positioning portion 311 is located at the wall portion 313 and connected with a bent structure as the guiding function. Herein, the two first positioning portions 311 are located at the opposite sides of the frame body 31 and on the opposite sides of the wall portion 313, respectively. Besides, the frame body 31 can include at least one guiding portion 315. A part of the guiding portion 315 is connected with the first positioning portion 311 to form a bent structure, and the other part of the guiding portion 315 is opposite to the first positioning portion 311. The guiding portion 315 is used to guide the entrance of the light-emitting unit 32 to facilitate the assembly. In other words, the guiding portion 315 is composed of a pair of the corresponding guiding elements. The first guiding element 3151 is connected with the first positioning portion 311, or it is regarded that the first positioning portion 311 includes the first guiding element 3151 with a bend. The second guiding element 3152 extends from the wall portion 313 and is opposite to the first guiding element 3151. The circuit board 322 passes through an interval between the first guiding element 3151 and the second guiding element 3152. Herein, a part of the guiding portion 315 (the first guiding element 3151) is integrally formed with the first positioning portion 311. A part of the guiding portion 315 has an arc angle (an inclining angle corresponding to the wall portion 313) to guide the light-emitting unit 32 during the assembly process and avoid damaging the light-emitting unit 32. Besides, the frame body 31 can further include a connector stopping portion 316, which is located corresponding to a connector 321 of the light-emitting unit 32 to prevent the connector 321 from scraping other components such as the light-guiding plate and the optical films.

The light-emitting unit 32 includes a circuit board 322 and a plurality of light-emitting elements 323. The light-emitting elements 323 are disposed on the circuit board 322 and can be light-emitting diode (LED) elements for example. The circuit board 322 includes at least one second positioning portion 324, and here are two second positioning portions 324 for example. Each of the second positioning portions 324 includes a notch 3241 and an extension portion 3242. The light-emitting unit 32 and the frame body 31 are connected with each other by the engagement between the first positioning portion 311 and the second positioning portion 324. Herein, the two second positioning portions 324 are located at the opposite sides of the circuit board 322 respectively, and the notches 3241 are toward the same direction, i.e. the upper side of the circuit board 322 herein. The second positioning portion 324 of this embodiment is an L-like structure for example. Moreover, the light-emitting unit 32 can further include a connector 321, which is disposed on the circuit board 322 and can provide the electricity for the light-emitting elements 323 when connected with a circuit. Besides, the light-emitting unit 32 can further include an adhesive element 326 (such as a double-sided adhesive tape or an adhesive layer), which can connect the light-emitting unit 32 and the frame body 31. After the assembly is completed, the adhesive element 326 is disposed between the circuit board 322 and the frame body 31 to connect the circuit board 322 and the frame body 31 for fixing the circuit board 322 on the wall portion 313 of the frame body 31 by the adhesion.

The following is the process of the assembly of the light-emitting unit 32 and the frame body 31.

As shown in FIGS. 3A and 3B, the first step is to downward insert the circuit board 322 of the light-emitting unit 32 in a direction vertical to the bottom portion 312 into the frame body 31, so the second positioning portion 324 of the light-emitting unit 32 is disposed at the first positioning portion 311 of the frame body 31 or the notch 3241 of the circuit board 322 is located corresponding to the first positioning portion 311. During the process of inserting the light-emitting unit 32 downward into the frame body 31, the light-emitting unit 32 can be guided by the guiding portion 315 of the frame body 31 (at least one of the first guiding element 3151 and the second guiding element 3152) for the entrance, so as to enhance the product yield and the assembly performance and also avoid damaging the light-emitting unit 32. Then, when the light-emitting unit 32 is at a proper position (for example, when the bottom side of the circuit board 322 of the light-emitting unit 32 contacts the bottom portion 312 of the frame body 31), the second step as shown in FIG. 3B is to move the circuit board 322 to a side of the frame body 31, i.e. the wall portion 313, or to move the circuit board 322 to the direction of the first positioning portion 311 in other words. Thus, the adhesive element 326 at the back of the circuit board 322 is attached to the wall portion 313 of the frame body 31 as shown in FIG. 3C. At this time, as shown in FIG. 3C, the first positioning portion 311 and the second positioning portion 324 engage with each other. The notch 3241 of the second positioning portion 324 holds at least a part of the first positioning portion 311. Accordingly, the light-emitting unit 32 and the frame body 31 can be connected with each other by the engagement between the first positioning portion 311 and the second positioning portion 324. In the assemble process, the light-emitting unit 32 simply needs to move along two directions, one of which is towards the bottom portion 312 (as the dotted arrow direction in FIG. 3A) and the other one is towards the wall portion 313 (as the dotted arrow direction in FIG. 3B). Because the light-emitting unit 32 simply needs to move along two straight directions, the assembly process of the light-emitting unit 32 and the frame body 31 can be implemented by the automation equipment. Therefore, the assembly process can be executed with automation. Accordingly, the product yield and the assembly performance are enhanced. The edge-lit backlight module 3 of this embodiment can be assembled by automation or manual operation. Besides, in this embodiment, the bottom portion 312 of the frame body 31 will not be additionally hollowed to form an opening for the first positioning portion 311, so the light leakage and the object invasion can be reduced.

The following embodiments illustrate other variations of the connector stopping portion. For the sake of clarity, the following figures do not show the first and second positioning portions and their related details. But the following embodiments still can be applied to the previous embodiments, or the elements or manners of the previous embodiments can be applied to the following embodiment.

Figure 4:
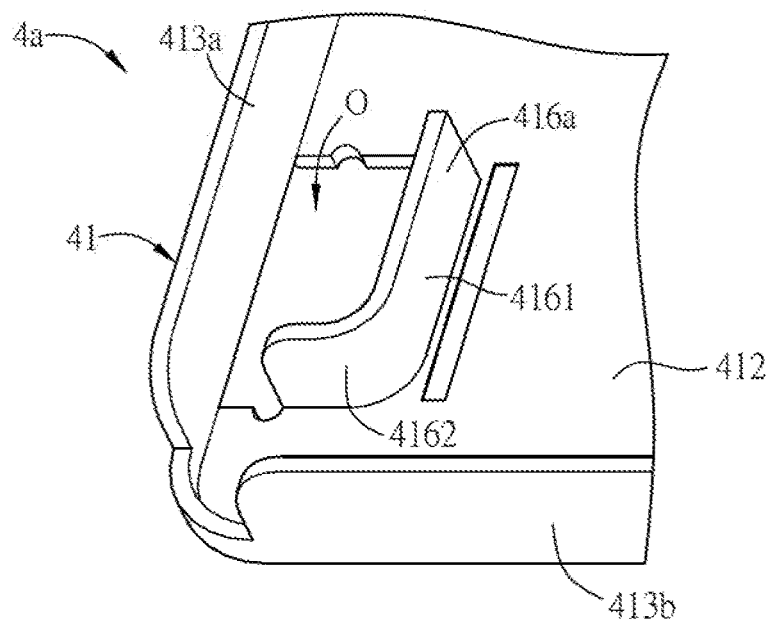
FIGS. 4, 5, 6, 7, 8A, 8B, 9A and 9B are schematic diagrams of the connector stopping portion according to embodiments.

FIG. 4 is a schematic diagram of the connector stopping portion 416a according to one embodiment. Referring to FIG. 4, in the embodiment, the frame body 41 of the edge-lit backlight module 4a includes a bottom portion 412 and two wall portions 413a, 413b. Because the relationships between the bottom portion 412 and the wall portions 413a, 413b and their variations can refer to the previous embodiments, they are not repeated here. The frame body 41 further includes a connector stopping portion 416a. The connector stopping portion 416a is disposed corresponding to the connector of the light-emitting unit (not shown in the figure) to prevent the connector from scraping other components such as the light-guiding plate and the optical films. The connector stopping portion 416a is located at the bottom portion 412. The bottom portion 412 has an opening O, and the connector stopping portion 416a is adjacent to the opening O. In the embodiment, the connector stopping portion 416a has a stopping element 4161 and at least one bent element 4162. The stopping element 4161 is opposite to the wall portion 413a, and the bent element 4162 extends from the stopping element 4161 to the wall portion 413a. Here, the stopping element 4161 is substantially parallel to the wall portion 413a and substantially perpendicular to the wall portion 413b, and an interval exists between the bent element 4162 and the wall portion 413a. By the bent element 4162, the structure strength of the connector stopping portion 416a is improved and the connector is prevented from scraping other components.

Figure 5:
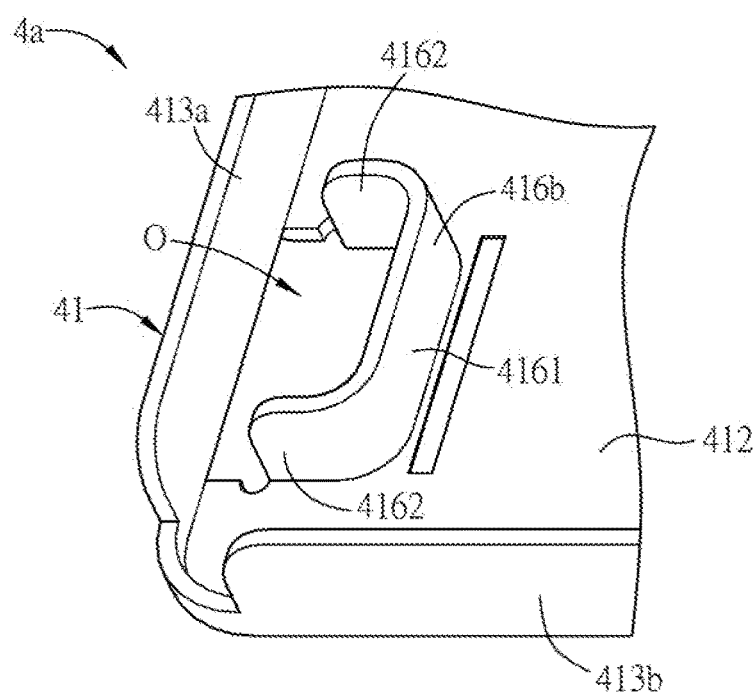

FIG. 5 is a schematic diagram of the connector stopping portion 416b according to another embodiment. In the edge-lit backlight module 4b in FIG. 5, a difference from the embodiment in FIG. 4 is that the connector stopping portion 416b includes two bent elements 4162, and the bent elements 4162 are respectively located at two ends of the stopping element 4161. The two bent elements 4162 respectively extend from the two ends of the stopping element 4161 to the wall portion 413a. Here, the two bent element 4162 are disposed by a distance from the wall portion 413a respectively.

Figure 6:
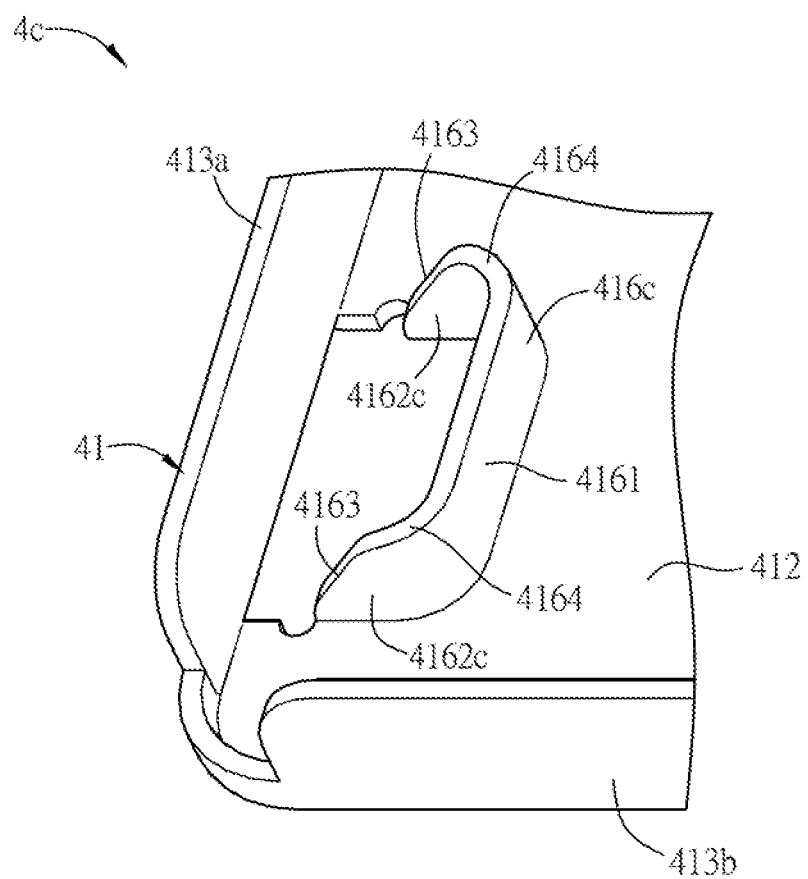

FIG. 6 is a schematic diagram of the connector stopping portion 416c according to another embodiment. In the edge-lit backlight module 4c in FIG. 6, a difference from the embodiment in FIG. 5 is that each bent element 4162c has at least one slant surface 4163. The slant surface 4163 inclines from a top surface 4164 of the bent element 4162 to the bottom portion 412. By the slant surface 4163, the connector and the connector stopping portion 416c may collide with each other as little as possible.

Figure 7:
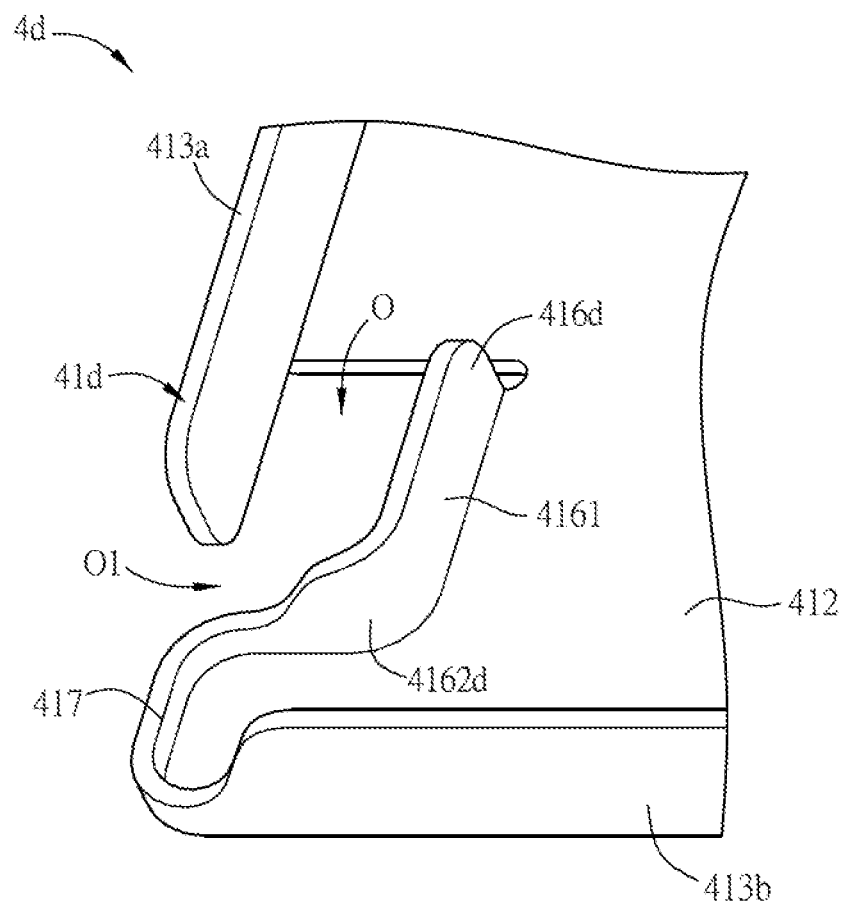

FIG. 7 is a schematic diagram of the connector stopping portion 416d according to another embodiment. In the edge-lit backlight module 4d in FIG. 7, a difference from the embodiment in FIG. 4 is that the frame body 41d further includes a U-like portion 417. The U-like portion 417 is located between the wall portion 413a and the wall portion 413b, and the bent element 4162d is connected to the wall portion 413b through the U-like portion 417. Here, the U-like portion 417 is not connected to the wall portion 413a, and an opening O1 exists between the U-like portion 417 and the wall portion 413a. The opening O1 communicates with the opening O.

Figure 8A:
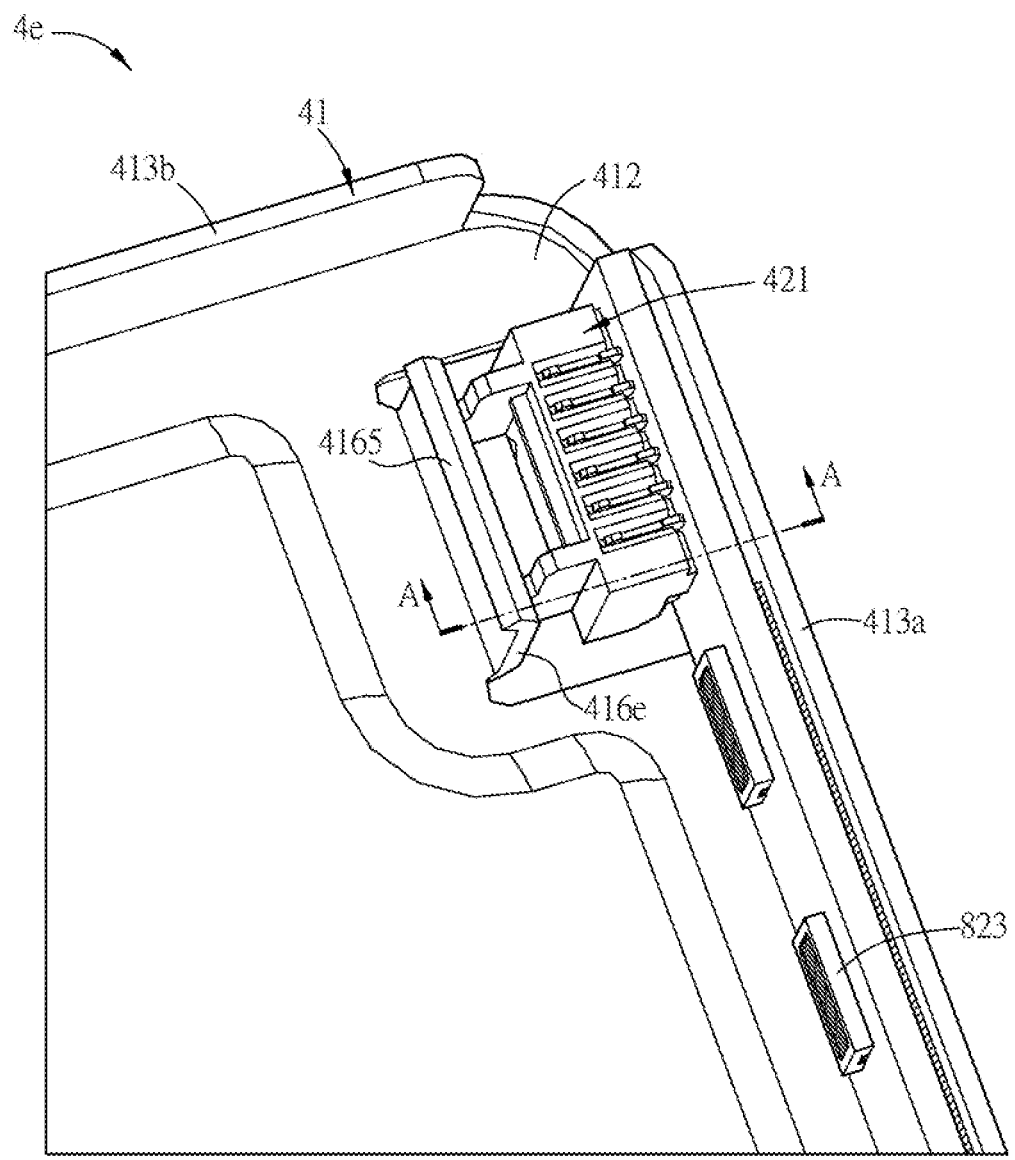
Figure 8B:
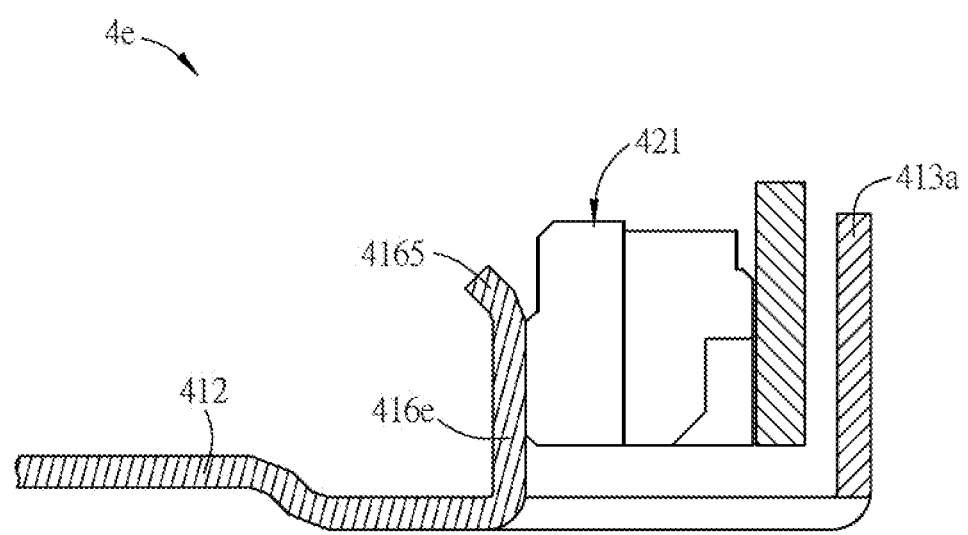

FIG. 8A and FIG. 8B are schematic diagrams of the connector stopping portion 416e according to another embodiment. FIG. 8B is a sectional schematic diagram along line A-A in FIG. 8A. In the edge-lit backlight module 4e in FIG. 8A and FIG. 8B, the connector stopping portion 416e at its one end away from the bottom portion 412 includes a curved guiding portion 4165. By the guiding portion 4165, the assemble process for the light emitting unit can be smoother and more efficient.

Figure 9A:
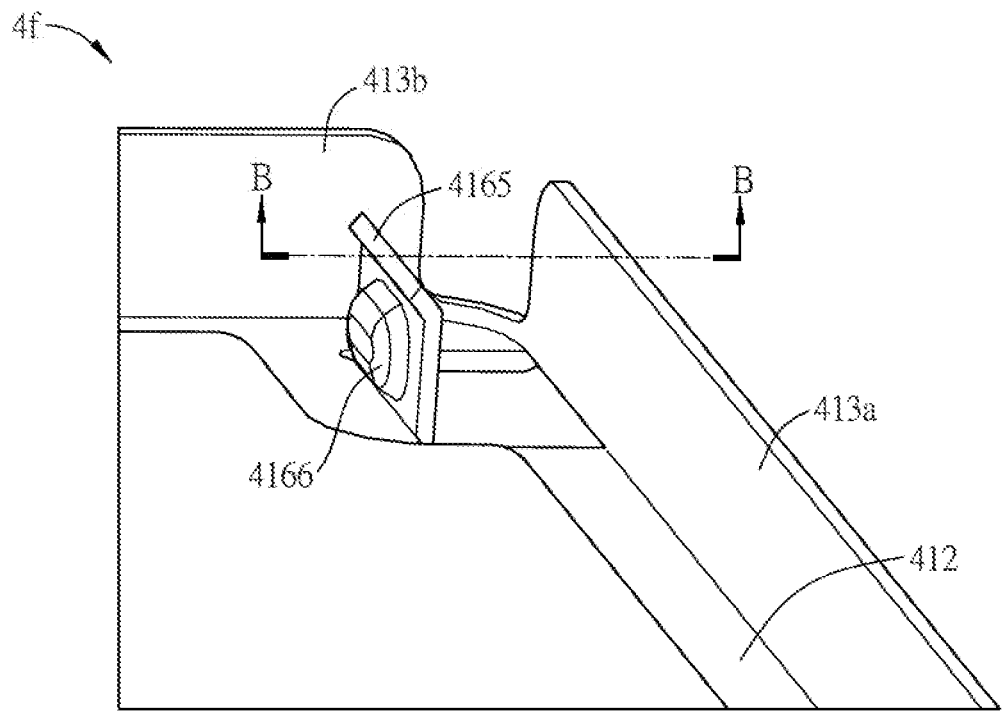
Figure 9B:
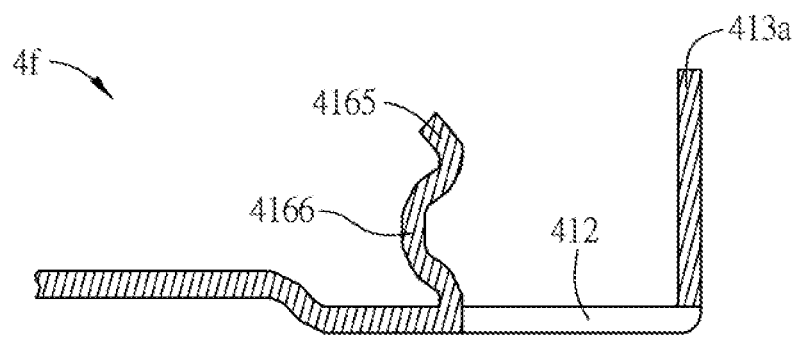

FIG. 9A and FIG. 9B are schematic diagrams of the connector stopping portion 416f according to another embodiment. FIG. 9B is a sectional schematic diagram along line B-B in FIG. 9A. In the edge-lit backlight module 4f in FIG. 9A and FIG. 9B, the connector stopping portion 416f includes a concave portion 4166, and the concave portion 4166 concaves toward a direction away from the wall portion 413a. Moreover, in the embodiment, the connector stopping portion 416f at its one end away from the bottom portion 412 includes a curved guiding portion 4165. The guiding portion 4165 and the concave portion 4166 are connected to form a structure with multiple bends so the connector stopping portion 416f is somewhat flexible. Thus, the assembly performance of the light-emitting unit and the product yield of the edge-lit backlight module 4f can be enhanced.

As mentioned above, according to some embodiments, in the edge-lit backlight module, the frame body includes at least one first positioning portion, the circuit board of the light-emitting unit includes at least one corresponding second positioning portion, and the second positioning portion includes a notch and an extension portion extending from the circuit board, so the light-emitting unit and the frame body can be connected with each other by engaging the first positioning portion with the second positioning portion. Accordingly, in comparison with the conventional art, the circuit board of the edge-lit backlight module is configured with the second positioning portion, and the first positioning portion is designed corresponding to the second positioning portion, so the light-emitting unit can be installed and fixed to the frame body by the movement in two or three straight directions. Thereby, the assembly process can be implemented by the automation to replace the manual operation by the mechanical equipment, so the product yield and the assembly performance can be enhanced. Moreover, the assembly procedure can be appropriately switched to manual mode or automated mode depending on different requirements of production lines.

Besides, according to some embodiments, the assembly performance of the light-emitting unit and the product yield of the edge-lit backlight module are also enhanced due to the connector stopping portion.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An edge-lit backlight module, comprising:
   a frame body comprising a bottom portion, a wall portion connected with the bottom portion, and at least one first positioning portion located on at least one of the bottom portion and the wall portion; and
   a light-emitting unit comprising a circuit board and a plurality of light-emitting elements disposed on the circuit board, wherein the circuit board comprises at least one second positioning portion, the second positioning portion comprises a notch and an extension portion extending from the circuit board, and the first positioning portion and the second positioning portion engage with each other to connect the light-emitting unit with the frame body.

2. The edge-lit backlight module as recited in claim 1, wherein the number of the first positioning portion is two, and the two first positioning portions are located at opposite sides of the frame body respectively, wherein the number of the second positioning portion is two, and the two second positioning portions are located at opposite sides of the circuit board respectively.

3. The edge-lit backlight module as recited in claim 2, wherein the notch is outwardly from the circuit board or toward the center of the circuit board.

4. The edge-lit backlight module as recited in claim 1, wherein the frame body comprises at least one opening located at the bottom portion, and a part of the circuit board passes through the opening.

5. The edge-lit backlight module as recited in claim 4, wherein the frame body comprises at least one pressing portion located at the wall portion and adjacent to the opening, the pressing portion acts as a first guiding element, a part of the bottom portion facing the opening forms a curved second guiding element, and the first guiding element and the second guiding element constitute a guiding portion.

6. The edge-lit backlight module as recited in claim 4, wherein the opening comprises a first opening and a second opening, the first opening is adjacent to the second opening, and a width of the first opening is greater than that of the second opening, wherein a part of the circuit board passes through the first opening and then moves towards the second opening, and the first positioning portion and the second positioning portion engage with each other.

7. The edge-lit backlight module as recited in claim 4, wherein the opening comprises a first opening and a second opening adjacent to the first opening, an extension direction of the first opening in width and an extension direction of the second opening in width are both perpendicular to a straight direction from the first opening to the second opening, and the width of the first opening is greater than the width of the second opening.

8. The edge-lit backlight module as recited in claim 7, wherein the frame body further comprises a guiding portion, and a part of the guiding portion extends from an edge of the first opening to an edge of the second opening.

9. The edge-lit backlight module as recited in claim 1, wherein the light-emitting unit further comprises an adhesive element disposed between the circuit board and the frame body to fix the circuit board to the frame body.

10. The edge-lit backlight module as recited in claim 1, wherein the second positioning portion is a U-like structure or an L-like structure.

11. The edge-lit backlight module as recited in claim 1, wherein the extension portion passes through the bottom portion, and the notch of the second positioning portion holds the first positioning portion.

12. The edge-lit backlight module as recited in claim 1, wherein a height of the notch is substantially greater than a thickness of the bottom portion of the frame body.

13. The edge-lit backlight module as recited in claim 1, wherein the frame body further comprises a guiding portion, and at least a part of the guiding portion and the first positioning portion are staggered.

14. The edge-lit backlight module as recited in claim 1, wherein the frame body further comprises a first guiding element and a second guiding element, the first guiding element is connected with the first positioning portion, and the second guiding element extends from the wall portion and is opposite to the first guiding element.

15. The edge-lit backlight module as recited in claim 1, wherein the frame body further comprises a guiding portion, and at least a part of the guiding portion is connected with the first positioning portion.

16. The edge-lit backlight module as recited in claim 1, wherein the light-emitting unit further comprises a connector disposed on the circuit board, and the frame body further comprises a connector stopping portion located corresponding to the connector.

17. The edge-lit backlight module as recited in claim 16, wherein the connector stopping portion comprises at least one stopping element and at least one bent element, the stopping element is opposite to the wall portion, and the bent element extends from the stopping element to the wall portion.

18. The edge-lit backlight module as recited in claim 17, wherein the number of the bent elements is two, and the bent elements are respectively located at two ends of the stopping element.

19. The edge-lit backlight module as recited in claim 17, wherein the bent element comprises at least one slant surface, and the slant surface inclines from a top surface of the bent element to the bottom portion.

20. The edge-lit backlight module as recited in claim 19, wherein the frame body further comprises a U-like portion and an additional wall portion connected to the bottom portion, the U-like portion is located between the wall portion and the additional wall portion, and the bent element is connected to the additional wall portion through the U-like portion.

* * * * *